(12) United States Patent
Chen et al.

(10) Patent No.: US 10,404,206 B2
(45) Date of Patent: Sep. 3, 2019

(54) GRID ASSEMBLY INTELLIGENT PHOTOVOLTAIC POWER GENERATION SYSTEM

(71) Applicant: AccelSpirit Inc., Taipei (TW)

(72) Inventors: Tsung-Hsin Chen, Taipei (TW); Hisayoshi Kobayashi, Tokyo-to (JP); Yongxiang Cui, Sichuang (CN); Kehtao Liu, Taipei (TW)

(73) Assignee: AccelSpriit Inc., Taipei (TW)

( * ) Notice: Subject to any disclaimer, the term of this patent is extended or adjusted under 35 U.S.C. 154(b) by 208 days.

(21) Appl. No.: 15/592,676

(22) Filed: May 11, 2017

(65) Prior Publication Data
US 2017/0331416 A1  Nov. 16, 2017

(30) Foreign Application Priority Data

May 12, 2016  (CN) ..................... 2016 2 0425517 U

(51) Int. Cl.
| | |
|---|---|
| *H02S 20/32* | (2014.01) |
| *H02S 20/10* | (2014.01) |
| *F24S 30/425* | (2018.01) |
| *F24S 20/00* | (2018.01) |
| *F24S 25/12* | (2018.01) |
| *F24S 25/617* | (2018.01) |
| *F24S 30/00* | (2018.01) |

(52) U.S. Cl.
CPC ............ *H02S 20/32* (2014.12); *F24S 30/425* (2018.05); *H02S 20/10* (2014.12); *F24S 25/12* (2018.05); *F24S 25/617* (2018.05); *F24S 2020/16* (2018.05); *F24S 2030/136* (2018.05); *Y02B 10/20* (2013.01); *Y02E 10/47* (2013.01)

(58) Field of Classification Search
CPC .. H02S 20/10; H02S 20/32; F24J 25/12; F24J 25/617; F24J 2020/16; F24J 2030/136; F24S 30/12; F24S 30/617; F24S 2020/16; F24S 2030/136
See application file for complete search history.

(56) References Cited

U.S. PATENT DOCUMENTS

2010/0139647 A1\*  6/2010  Silvestre Mata ..... F24S 30/455
126/604

\* cited by examiner

*Primary Examiner* — Matthew T Martin
(74) *Attorney, Agent, or Firm* — C. G. Mersereau; DeWitt LLP

(57) ABSTRACT

A grid assembly intelligent photovoltaic power generation system includes a supporting unit, a separated composite stand secured on the supporting unit, a shaft with a square cross-section shape arranged on the separated composite stand and capable of rotating on the separated composite stand and a plurality of photovoltaic panels secured onto the shaft with a square cross-section shape and forming a single-row of photovoltaic panel grid; wherein in a condition that a plurality of the photovoltaic panel grids form a photovoltaic array, a certain distance is formed between each row of the photovoltaic panel grid. The present invention overcomes the problem of sunlight blind spots of traditional photovoltaic array power stations, and the present invention can be installed on top of fishponds and agricultural lands such that the top of the structure utilizes the photovoltaic panels for power generation and the bottom thereof can be used for growth of agricultural corps in order to achieve diverse utilization of land.

8 Claims, 29 Drawing Sheets

GRID ASSEMBLY INTELLIGENT PHOTOVOLTAIC POWER GENERATION SYSTEM

BACKGROUND OF THE INVENTION

Field of the Invention

The present invention is related to a photovoltaic system capable of being integrated with various types of agricultural productions, in particular, to a grid assembly intelligent photovoltaic power generation system.

Description of Related Art

With the progress of the society and technologies, in the industry of photovoltaics, the cost of photovoltaic power generation shows a decreasing trend, and it is expected that by year 2020, the power generation capacity of clean energy achieved will be of the same competitiveness as the capacity of the coal power generation with the cost of the power generation similar to that of the coal power generation. The percentage of the solar energy photovoltaic power generation in the energy system of human beings is increasing at a rapid speed and its development outlook is promising. Currently, most of the photovoltaic power generations adopt the fixed (or adjustable) wide array systems with the inclination angle facing toward the north and south direction; however, due to the shadows at the north and south direction projected greatly on the system, blind spots without sunlight exposure through the year are likely to be created. The daylight blind spots are unfavorable to the growth of plants and are likely to become sandy lands. In addition, despite that the photovoltaic array in the north-south direction uses adjustable inclination angles, the utilization rate of the sunlight is still low. All of the above are found to be common drawbacks for the photovoltaic array in north-south direction.

In actual practice, it is found that such traditional array of photovoltaic power generation devices are mostly fixed devices, and the photovoltaic panels are of fixed angles and positions such that they cannot be rotated along with the sun; consequently, during most of the time, the sunlight is projected onto the photovoltaic panels obliquely such that the conversion efficiency is significantly reduced, and the plant growth is also affected. Despite that some devices are installed with the sunlight tracking device, nevertheless, it is of greater structural complexity and consumes greater energy for its own structure; therefore, the efficiency of the solar power generation device is affected in addition to that the installation height needs to be high, which is likely to be affected by the wind at the northwest areas in China.

In addition, with the rapid development of the distributed application of photovoltaics, the regular array photovoltaic power stations are found to have the drawbacks that since the ground of such photovoltaic array creates greater sunlight blind areas, and the space for support system underneath the photovoltaic panel array is relative small with various of height, consequently, the integration of agriculture and photovoltaics cannot be achieved easily.

SUMMARY OF THE INVENTION

In view of the aforementioned drawback, the present invention provides a grid assembly intelligent photovoltaic power generation system capable of solving the problem of the large sunlight blind spot area of land or agricultural shed underneath photovoltaic panels and solving the complicated traditional horizontal single-axle independently controlled structure along with the utilization of grid photovoltaic array formed by reasonably rotating a plurality of single-row photovoltaic units to prevent strong winds and to reduce drag. In addition, the present invention is also able to prevent accumulation of snows on top of the photovoltaic panels in order to prevent damages of the photovoltaic panels due to resistance formed by the hot spot effect of the photovoltaic units; therefore, it is able to greatly reduce the damages of the photovoltaic power station by sandstorm and wind such that the operation cost and safety risks of enterprises can be reduced. Moreover, with the primary beams and secondary beams intersect with each other into webs on the high-rise stand system, the stability thereof is strengthened, and a grid assembly intelligent photovoltaic power generation system with greater rigidity and toughness can be provided. The present invention utilizes the web structure such that it is of great stability and high rigidity with toughness such that it is applicable to the installation and use in various type of environments. Furthermore, it is able to perform daily sunlight tracking for 8-10 hours (except for cloudy days); therefore, the power generation efficiency of the same area and structure for fixed electromagnetic units can be increased by 15%~25% such that the power generation efficiency of the solar assembly is significantly increases. Moreover, the present invention is of small size and light weight with facilitated installation. In addition, the present invention is designed for uses at remote mountain areas without power sources such that it is able to perform sunlight tracking without the use of external power source while having excellent wind resistance performance.

Accordingly, the present invention provides a grid assembly intelligent photovoltaic power generation system, comprising a supporting unit; a separated composite stand secured on the supporting unit; a shaft with square of a shape of cross-section arranged on the separated composite stand and capable of rotating on the separated composite stand; and a plurality of photovoltaic panels secured onto the shaft with square of a shape of cross-section and forming a single-row of photovoltaic panel grid; wherein in a condition that a plurality of the photovoltaic panel grids form a photovoltaic array, a certain distance is formed between each row of the photovoltaic panel grid. With such structure, the present invention is able to overcome the problem of greater area of sunlight blind spot on land or agricultural shed underneath the photovoltaic panels, and it is also able to achieve simple and effective rotational control of the photovoltaic panels in order to overcome the complicated traditional horizontal single-axle independently controlled structure.

According to the grid assembly intelligent photovoltaic power generation system of the present invention, wherein the supporting unit comprises a standing column, a main beam with double-slot and a base; a top portion of the standing column is connected to the main beam with double-slot and a bottom portion thereof is connected to the base. With such reasonable design of the supporting unit, the present invention is made more stable and reliable.

According to the grid assembly intelligent photovoltaic power generation system of the present invention, wherein the shaft with square of a shape of cross-section and the main beam with double-slot are arranged perpendicular to each other and are installed onto the separated composite stand via a self-lubricating composite sleeve with a square shape-to-circle shape portion; a bottom portion of the separated composite stand is connected to T-shape bolts installed inside slots at a top portion of the main beam with double-slot; the photovoltaic panels are installed onto the shaft with square of a shape of cross-section via a secure beam. Since the main beam with double-slot is arranged perpendicular to the shaft with square of a shape of cross-section and connected via the separated composite stand, the present invention can be formed into a web structure such that when a certain number of main beams with double-slot are installed to form a single-row of photovoltaic array, it can be of greater stability and improved performance in terms of wind resistance and prevention of tipping over from the side.

According to the grid assembly intelligent photovoltaic power generation system of the present invention, further comprising a transmission shaft and a driving shaft; the transmission shaft includes one end connected to the shaft with square of a shape of cross-section and another end connected to the driving shaft.

According to the grid assembly intelligent photovoltaic power generation system of the present invention, further comprising an intelligent type control box with a processing unit, an angle detector and a driving mechanism; wherein the intelligent type control box with the processing unit is installed at the standing column, the angle detector is installed on the photovoltaic panel grid at a lateral side of the intelligent type control box with the processing unit, and the driving mechanism is connected to the driving shaft. The grid assembly intelligent photovoltaic power generation system uses the intelligent type control box with the processing unit to perform operation controls. The angle detector installed on the photovoltaic panel adjacent to the control box is able to send out angle signal for controlling the driving of the linkage shaft mechanism in order to drive the photovoltaic panels to rotate with their respective shafts with square of a shape of cross-section as centers; therefore, the daily sunlight tracking in east-west direction can be achieved or the inclination angle in the north-south direction is adjustable.

According to the grid assembly intelligent photovoltaic power generation system of the present invention, wherein the main beam with double-slot includes special slots for T-shape bolts formed on top and bottom portions thereof. With the reasonably designed slots on the main beam with double-slot the T-shape specialized bolts can achieve the installation of the separated composite stand and standing columns easily such that the automatic installation can be facilitated.

According to the grid assembly intelligent photovoltaic power generation system of the present invention, wherein a wear-resistant composite spacer is arranged between the separated composite stand and the self-lubricating composite sleeve with the square shape-to-circle shape portion. Such spacer is able reduce the friction between the separated composite stand and the self-lubricating composite sleeve with the square shape-to-circle shape portion.

According to the grid assembly intelligent photovoltaic power generation system of the present invention, wherein the standing column installation shaft at a top portion of the base includes two rows of secure holes formed thereon, and each row of the secure holes include three threaded holes arranged at 120 degrees with each other; a protective cover is arranged at a connecting portion between the base and the standing column.

According to the grid assembly intelligent photovoltaic power generation system of the present invention, wherein the self-lubricating composite sleeve with the square shape-to-circle shape portion includes a square hole formed at middle portion thereof, and a small circular plate and a large circular plate are arranged at two sides thereof respectively. A central circular column is arranged between the small and large circular plates; an axial line of the large circular plate and an axial line of the small circular plate are non-collinear. The self-lubricating composite sleeve with the square shape-to-circle shape portion is installed between the separated composite stand and the shaft with square of a shape of cross-section such that it is able to achieve the relative stationary movement between the shaft with square of a shape of cross-section and the self-lubricating composite sleeve with the square shape-to-circle shape portion in order to be rotated on the separated composite stand only. In addition, since the self-lubricating composite sleeve with the square shape-to-circle shape portion uses a self-lubricating material (such as polytetrafluoroethylene etc.), it is able to allow the connection between the shaft with square of a shape of cross-section and the separated composite stand to be stable and firm while reducing the friction coefficient therebetween such that their useful lifetime is longer. Moreover, a spacer is provided between the self-lubricating composite sleeve with the square shape-to-circle shape portion and the separated composite stand, the friction between the two can be further reduced.

According to the grid assembly intelligent photovoltaic power generation system of the present invention, wherein a top portion of the separated composite stand includes a sleeve installation portion having a circular hole formed thereon; a lower portion of the sleeve installation portion includes a vertical plate, and a side plate is arranged at two sides of the vertical plate and perpendicular to the vertical plate; a lower portion of the side plate includes a horizontal plate arranged perpendicular thereto, and the horizontal plate includes secure holes formed thereon.

According to the grid assembly intelligent photovoltaic power generation system of the present invention, wherein a connecting area between the standing column and the base further includes a protective cover arranged thereon.

The present invention includes the following advantages:

Advantage 1: The present invention is reasonably designed to use a plurality of photovoltaic panels secured onto shafts with square of a shape of cross-section to form a single-row photovoltaic array. A certain distance between each row of the photovoltaic array is provided, and each row of photovoltaic array is able to rotate via the cooperation between the driving shaft and the transmission shaft. Therefore, the present invention is able to overcome the problem of greater shaded areas of sunlight on the land or agricultural shed underneath the photovoltaic panels.

Advantage 2: The photovoltaic panels are designed into a single-row photovoltaic array, which simplifies the rotational control the photovoltaic panels and solves the complicated traditional horizontal single-axle independently controlled structure.

Advantage 3: A certain distance is provided between the rows of photovoltaic array, and each row of photovoltaic array is rotated via the cooperation between the driving shaft and the transmission shaft; therefore, the front and rear photovoltaic panels do not interfere with each other during the rotation process of the photovoltaic panels. In addition, with the rotation of the single-row photovoltaic array, the enhanced adaptiveness and performance of the present invention can be achieved. For example, in the event where the present invention is installed at an area with greater wind, snow or sandstorm, the single-row photovoltaic array can be reasonably rotated to avoid strong winds and to reduce drag as well as preventing accumulation of sand or snow on the photovoltaic panels. Since the accumulation of snow on the photovoltaic panels can be reduced, it is able to prevent damages on the photovoltaic panels due to the resistance caused by the melting snow; consequently, it is able to greatly reduce the damages of the photovoltaic industry caused by the sandstorm to reduce the operation cost as well as safety risk of enterprises.

Advantage 4: With the reasonably designed assembly stands, the top portion of the separated composite stands includes a sleeve installation portion having circular holes formed thereon and the lower portion of the sleeve installation portion includes a vertical plate, and a side plate is arranged at two sides of the vertical plate and perpendicular to the vertical plate; a lower portion of the side plate includes a horizontal plate arranged perpendicular thereto, and the horizontal plate includes secure holes formed thereon. Accordingly, the separated composite stand provides more stable installation of the shaft with square of a shape of cross-section while creating an excellent bridging effect between the shaft with square of a shape of cross-section and the main beam with double-slot; therefore, the stability of the present invention is better.

Advantage 5: With the reasonable designed self-lubricating composite sleeve with the square shape-to-circle shape portion in the present invention, the self-lubricating composite sleeve with the square shape-to-circle shape portion includes a square hole formed at middle portion thereof, and a small circular plate and a large circular plate are arranged at two sides thereof respectively. A central circular column is arranged between the small and large circular plates; an axial line of the large circular plate and an axial line of the small circular plate are non-collinear. The self-lubricating composite sleeve with the square shape-to-circle shape portion is installed between the separated composite stand and the shaft with square of a shape of cross-section such that it is able to achieve the relative stationary movement between the shaft with square of a shape of cross-section and the self-lubricating composite sleeve with the square shape-to-circle shape portion in order to be rotated on the separated composite stand only. In addition, since the self-lubricating composite sleeve with the square shape-to-circle shape portion uses a self-lubricating material (such as polytetrafluoroethylene etc.), it is able to allow the connection between the shaft with square of a shape of cross-section and the separated composite stand to be stable and firm while reducing the friction coefficient therebetween such that their useful lifetime is longer. Moreover, a square-to-circle spacer is provided between the self-lubricating composite sleeve with the square shape-to-circle shape portion and the separated composite stand, the friction between the two can be further reduced.

Advantage 6: With the reasonably designed base in the present invention, the standing column installation shaft at a top portion of the base includes two rows of secure holes formed thereon, and each row of the secure holes include three threaded holes arranged at 120 degrees with each other. The base is of an appealing design and is firmly connected to the standing column. In addition a protective cover can be provided at the connecting area between the standing column and the base in order to protect the connecting portion such that the connecting portion is not damaged due to rainwater.

Advantage 7: With the reasonable design of main beam with double-slot in the present invention, the top and bottom portions of the main beam with double-slot are formed of cross-shape slots. The main beam with double-slot is able to facilitate the connection and assembly of the present invention, and it is able to utilize the double-side photovoltaic panel for installation such that it is of high promotional values.

Advantage 8: The present invention can be installed at the center of roads, areas of shallow water or installed at deeper water with extended standing columns. When the present invention is installed at deep water area, double-side photovoltaic panels for power generation can be used in order to utilize the light reflected by the water surface for power generation such that the power generation capacity can be increased with resource integration.

Advantage 9: The present invention utilizes the web structure such that it is of great stability and high rigidity with toughness such that it is applicable to the installation and use in various type of environments. Furthermore, it is able to perform daily sunlight tracking for 8-10 hours (except for cloudy days); therefore, the power generation efficiency of the same area and structure for fixed electromagnetic units can be increased by 15%~25% such that the power generation efficiency of the solar photovoltaic assembly is significantly increases. Moreover, the present invention is of small dimension and light weight with facilitated installation. In addition, the present invention is designed for uses at remote mountain areas without power sources such that it is able to perform sunlight tracking without the use of external power source while having excellent wind resistance performance. Therefore, the present invention is suitable for promotional uses in wide range of applications.

Advantage 10: All of the system components of the present invention can be prefabricated in factory in standard sizes for field assembly and usage in sets, which overcomes the problem of large concrete construction required for traditional photovoltaic power stations; therefore, the present invention is environmental friendly and achieves the clean energy with clean production. The grid structure of the system is simple and the system space configuration is reasonable such that the space underneath the main beam of the range of 2.5-5 m height can be provided for other designs, offering great space for agricultural productions.

Advantage 11: The main beams with double-slot in the present invention can be arranged in different directions such that it can be divided into a north-south inclination angle adjustable system and east-west sunlight tracking system. The main beam arranged in the north-south direction can form an inclination angle adjustable grid photovoltaic array system; the main beam arranged in the east-west direction can form a photovoltaic east-west sunlight tracking grid photovoltaic array system.

DETAILED DESCRIPTION OF THE INVENTION

Figure 1:
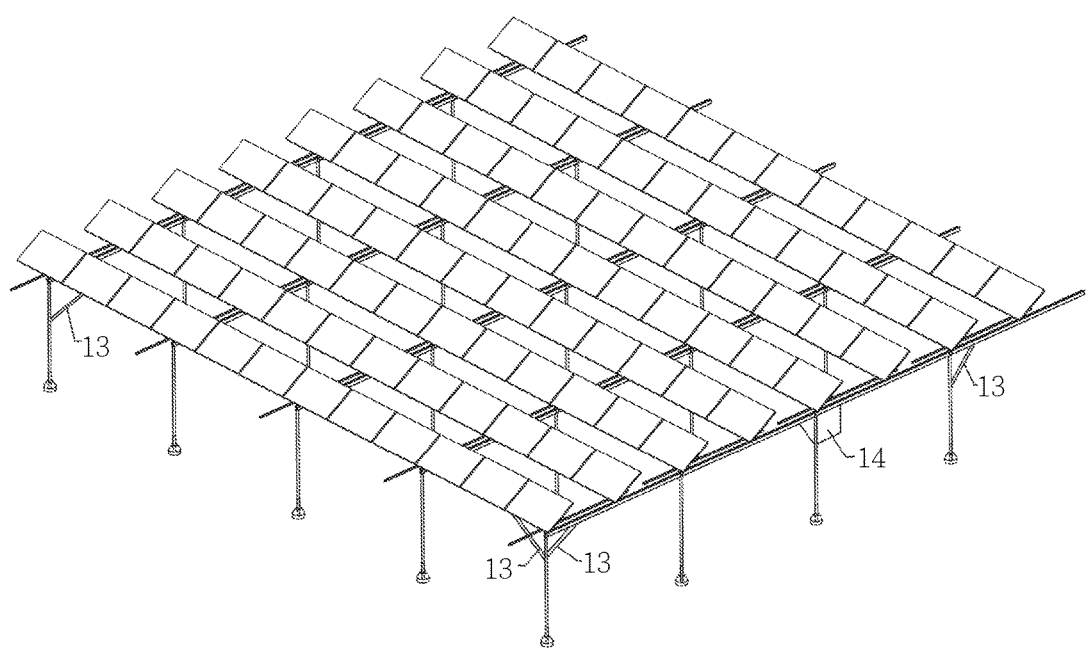
FIG. 1 is a schematic view showing an overall installation of the present invention.
Figure 2:
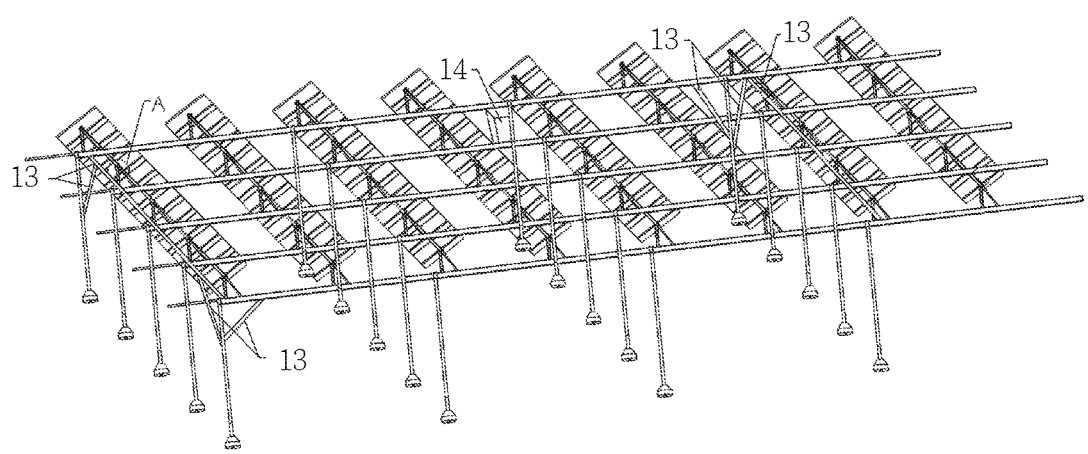
FIG. 2 is another schematic view showing an overall installation of the present invention.
Figure 3:
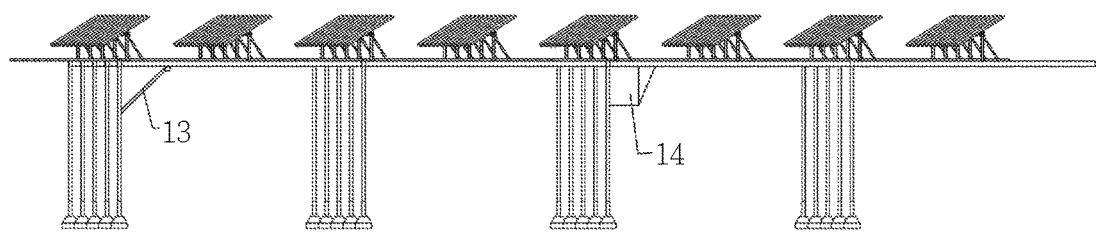
FIG. 3 is still another schematic view showing an overall installation of the present invention.

The following provides a detailed description on the technical solution of the embodiments of the present invention along with the accompanied drawings of FIG. 1~FIG. 29. Clearly, it can be understood that the embodiments described in the following refer to only a portion of the embodiments of the present invention, which shall not be treated as all of the embodiments of the present invention. In view of the embodiments of the present invention, any other embodiments achieved by a person skilled in the art in this field based on the present invention without any effort of inventiveness shall be considered to be part of the scope of the present invention.

As shown in FIG. 1~FIG. 29, the present invention provides a grid assembly intelligent photovoltaic power generation system, comprising a supporting unit, a separated composite stand 2, a shaft with square of a shape of cross-section 5 and photovoltaic panels 1. The shaft with square of a shape of cross-section 5 is arranged on the separated composite stand 2 and is capable of rotating on the separated composite stand 2. The separated composite stand 2 is secured on the supporting unit. A plurality of photovoltaic panels 1 are secured onto the shaft with square of a shape of cross-section 5 to form a single-row of photovoltaic panel grid; wherein in a condition that a plurality of the photovoltaic panel grids form a photovoltaic array, a certain distance is formed between each row of the photovoltaic panel grid.

The supporting unit comprises a standing column 3, a main beam with double-slot 4 and a base 8. The top portion of the standing column 3 is connected to the main beam with double-slot 4 and a bottom portion thereof is connected to the base 8.

The shaft with square of a shape of cross-section 5 and the main beam with double-slot 4 are arranged perpendicular to each other and are installed onto the separated composite stand 2 via a self-lubricating composite sleeve with the square shape-to-circle shape portion 9. The bottom portion of the separated composite stand 2 is connected to T-shape bolts installed inside slots 41 at a top portion of the main beam with double-slot 4. The photovoltaic panels 1 are installed onto the shaft with square of a shape of cross-section 5 via a secure beam 10.

The present invention further comprises a transmission shaft 7 and a driving shaft 6. The transmission shaft 7 includes one end connected to the shaft with square of a shape of cross-section 5 and another end connected to the driving shaft 6.

The present invention further comprises an intelligent type control box with a processing unit 14, an angle detector and a driving mechanism; wherein the intelligent type control box with the processing unit 14 is installed at the standing column 3, the angle detector is installed on the photovoltaic panel grid at a lateral side of the intelligent type control box with the processing unit 14, and the driving mechanism is connected to the driving shaft 6.

The main beam with double-slot 4 includes special slots 41 for T-shape bolts formed on top and bottom portions thereof.

A wear-resistant composite spacer 11 is arranged between the separated composite stand 2 and the self-lubricating composite sleeve with the square shape-to-circle shape portion 9.

The standing column installation shaft 81 at a top portion of the base 8 includes two rows of secure holes formed thereon, and each row of the secure holes include three threaded holes arranged at 120 degrees with each other. A protective cover is arranged at a connecting portion between the base 8 and the standing column 3.

The self-lubricating composite sleeve with the square shape-to-circle shape portion 9 includes a square hole formed at middle portion thereof, and a small circular plate 93 and a large circular plate 91 are arranged at two sides thereof respectively. A central circular column 92 is arranged between the large circular plate 91 and small circular plate 93. The axial line of the large circular plate 91 and the axial line of the small circular plate 93 are non-collinear.

The top portion of the separated composite stand 2 includes a sleeve installation portion 21 having a circular hole formed thereon. The lower portion of the sleeve installation portion 21 includes a vertical plate 24, and a side plate 22 is arranged at two sides of the vertical plate 24 and perpendicular to the vertical plate 24. The lower portion of the side plate 22 includes a horizontal plate 23 arranged perpendicular thereto, and the horizontal plate 23 includes secure holes 25 formed thereon.

As shown in FIG. 1, the present invention can be reconfigured to increase and expand the photovoltaic panels according to different conditions. The single-row photovoltaic array can use the driving linkage shaft mechanism to control the movement of the driving shaft 6, and the driving shaft 6 can further drive the transmission shaft 7 to move, followed by using the transmission shaft 7 to push the shaft with square of a shape of cross-section 5 to rotate such that the entire single-row of photovoltaic array is driven to rotate; therefore, it is able to achieve the adjustment of the angle of the photovoltaic panels 1. At different regions, the inclination angle of the photovoltaic panels 1 can be different. In addition, the inclination photovoltaic system can also be used to calculate and control the inclination angle of the photovoltaic panels 1 at each time interval such that the photovoltaic panels 1 being arranged at the most optimal positions at all times can be achieved, and it is of the highest utilization rate of the sunlight. After the entire system is assembled completely, the end portion and the central portion of the system can be further arranged with stabilizing supportive stands 13 respectively in order to ensure that during the process of use, the present invention is more stable and reliable.

In addition, a gap is designed between the rear and front signal-row of the photovoltaic array in order to ensure that when the photovoltaic panels 1 are rotated to the horizontal level, there is still a certain distance between the front and rear photovoltaic panels; therefore, such configuration is able to prevent interference between the front and rear photovoltaic panels during the rotation thereof. Furthermore, with the reasonable design of the gap and the rotation of the photovoltaic panels, the photovoltaic panels 1 can be rotated to control the amount of sunlight exposure for the land or agricultural sheds 12 underneath the photovoltaic panels 1; therefore, the amount of sunlight exposure for the land or agricultural sheds 12 underneath the photovoltaic panels is adjustable, which facilitates the growth of the agricultural crops on land or in the agricultural sheds 12.

Figure 4:
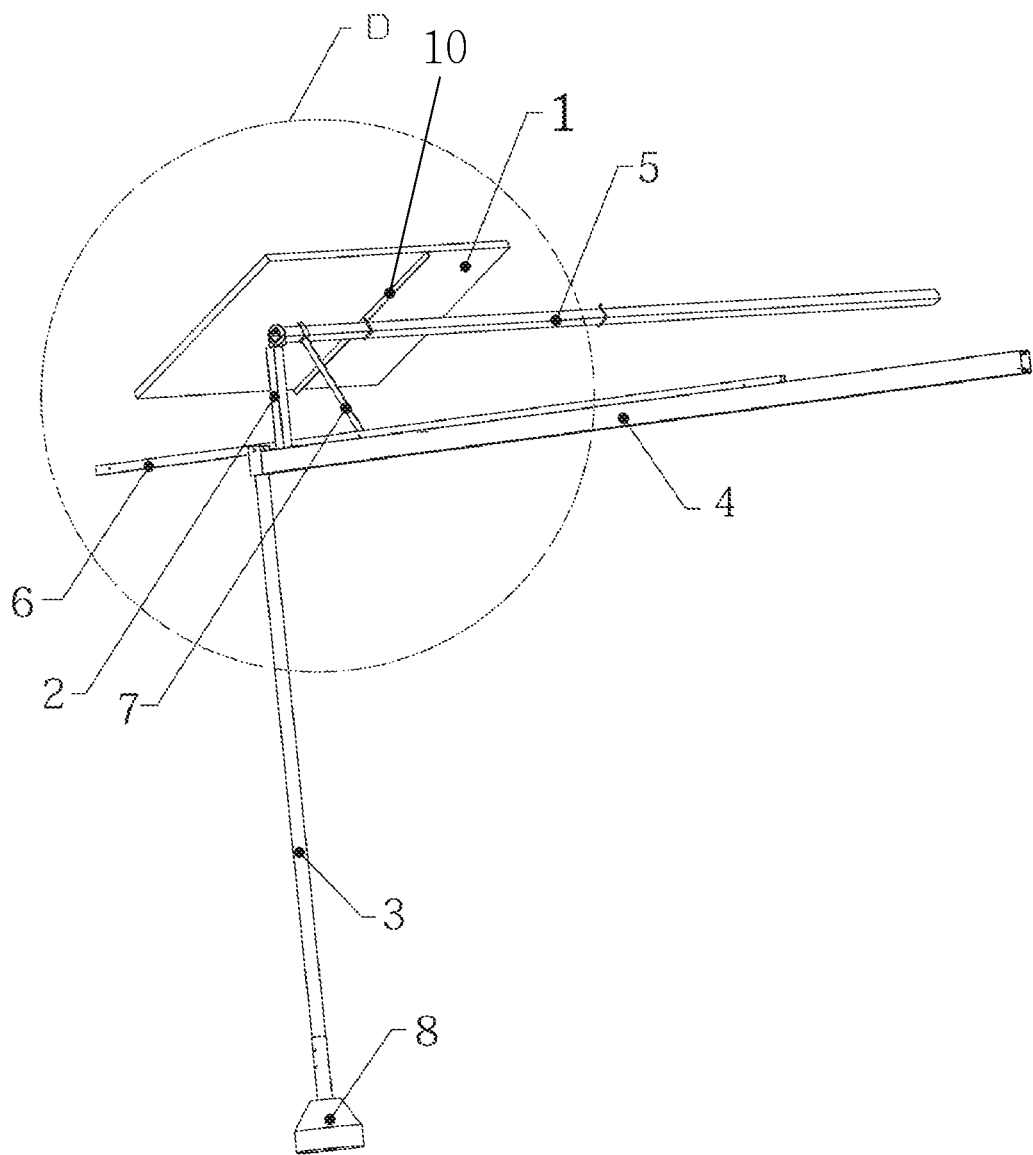
FIG. 4 is a schematic view showing a partial connection of the present invention.
Figure 5:
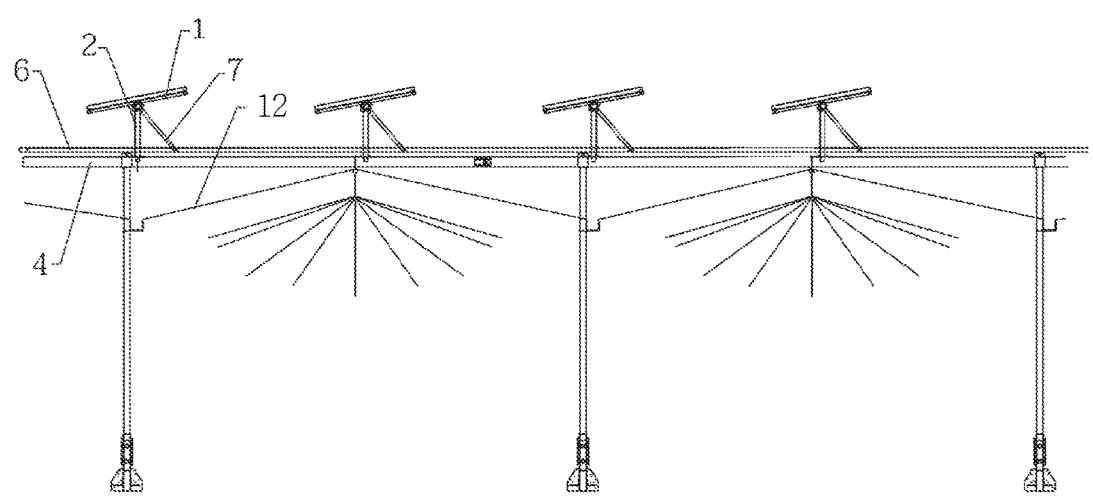
FIG. 5 is a schematic view of the present invention after the installation of agricultural sheds.
Figure 6:
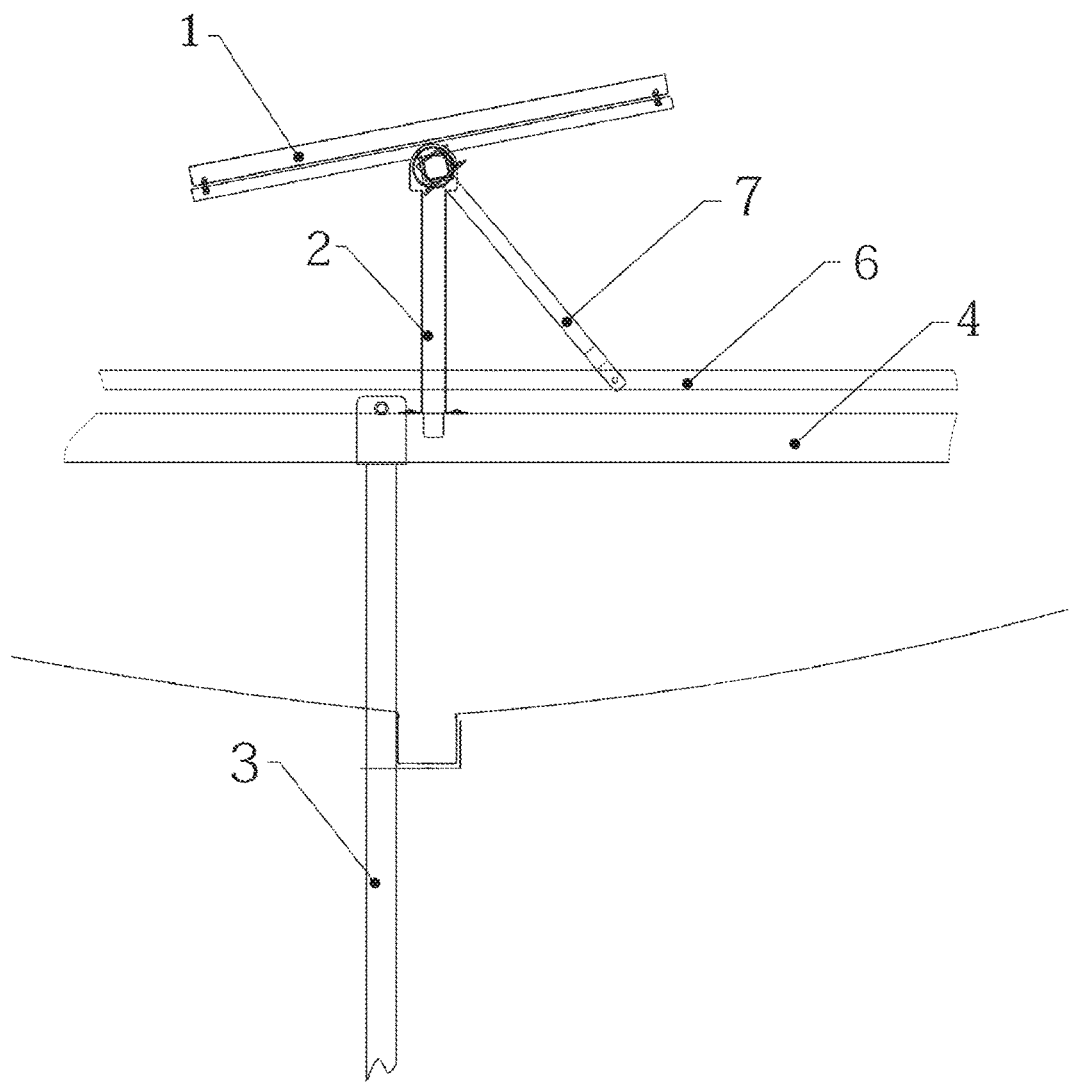
FIG. 6 is a schematic view of the a portion of the present invention after the installation of agricultural sheds.
Figure 7:
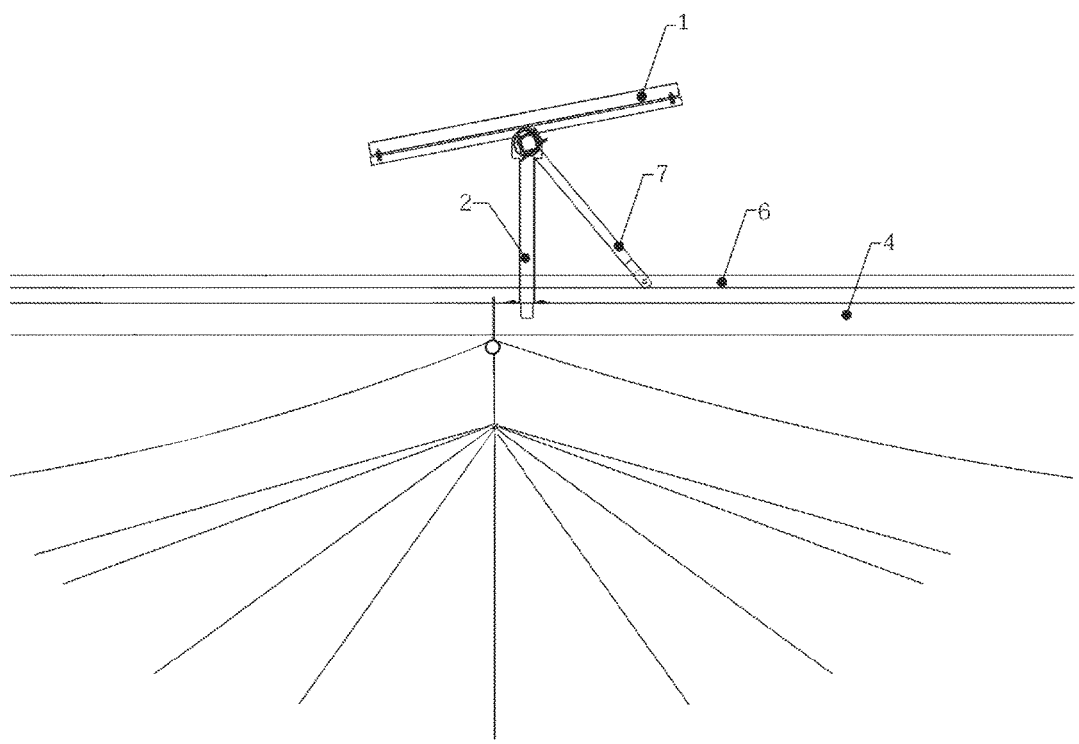
FIG. 7 is a schematic view of an internal of the present invention after the installation of agricultural sheds.
Figure 8:
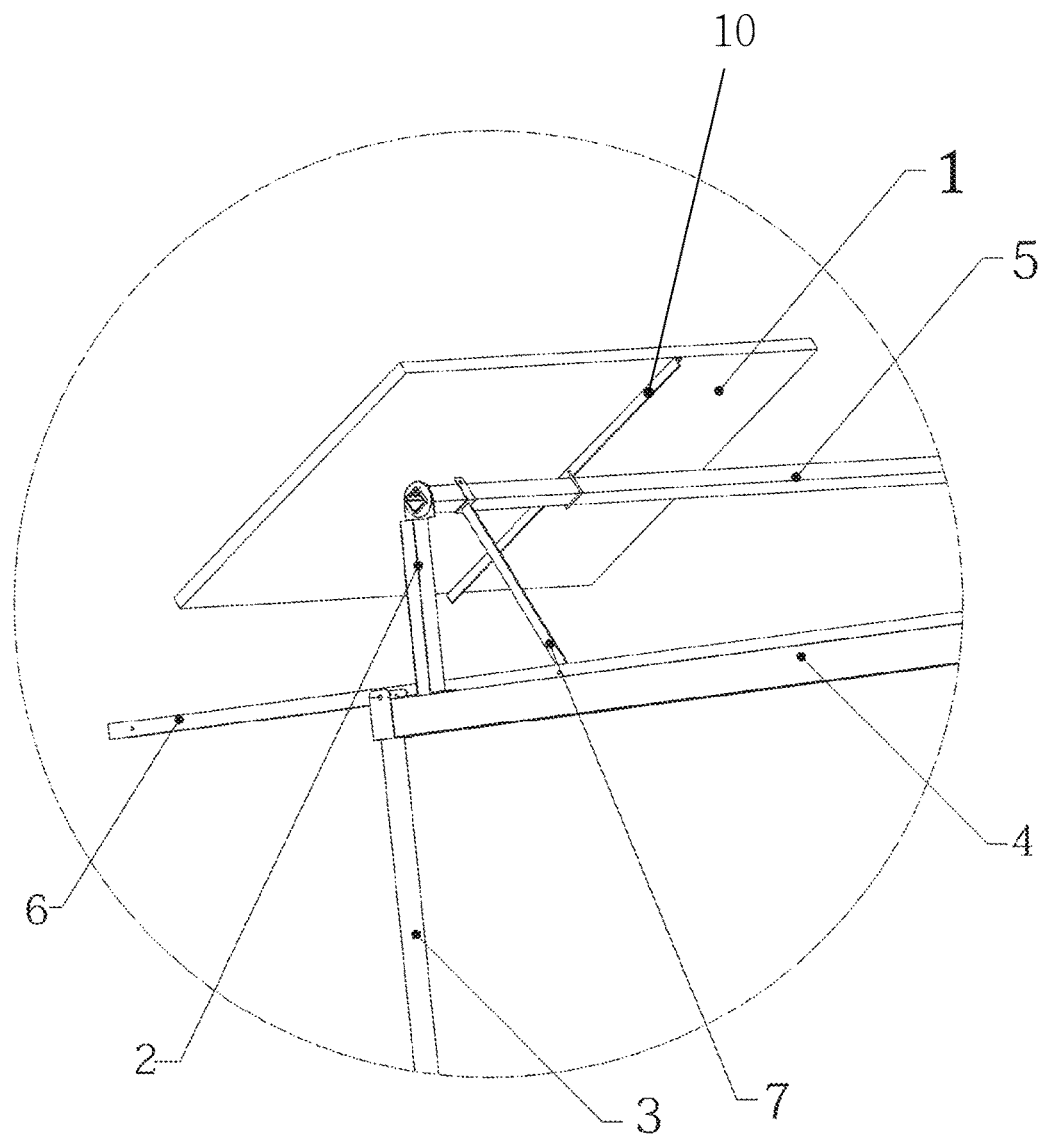
FIG. 8 is a partially enlarged view of D in FIG. 4.
Figure 9:
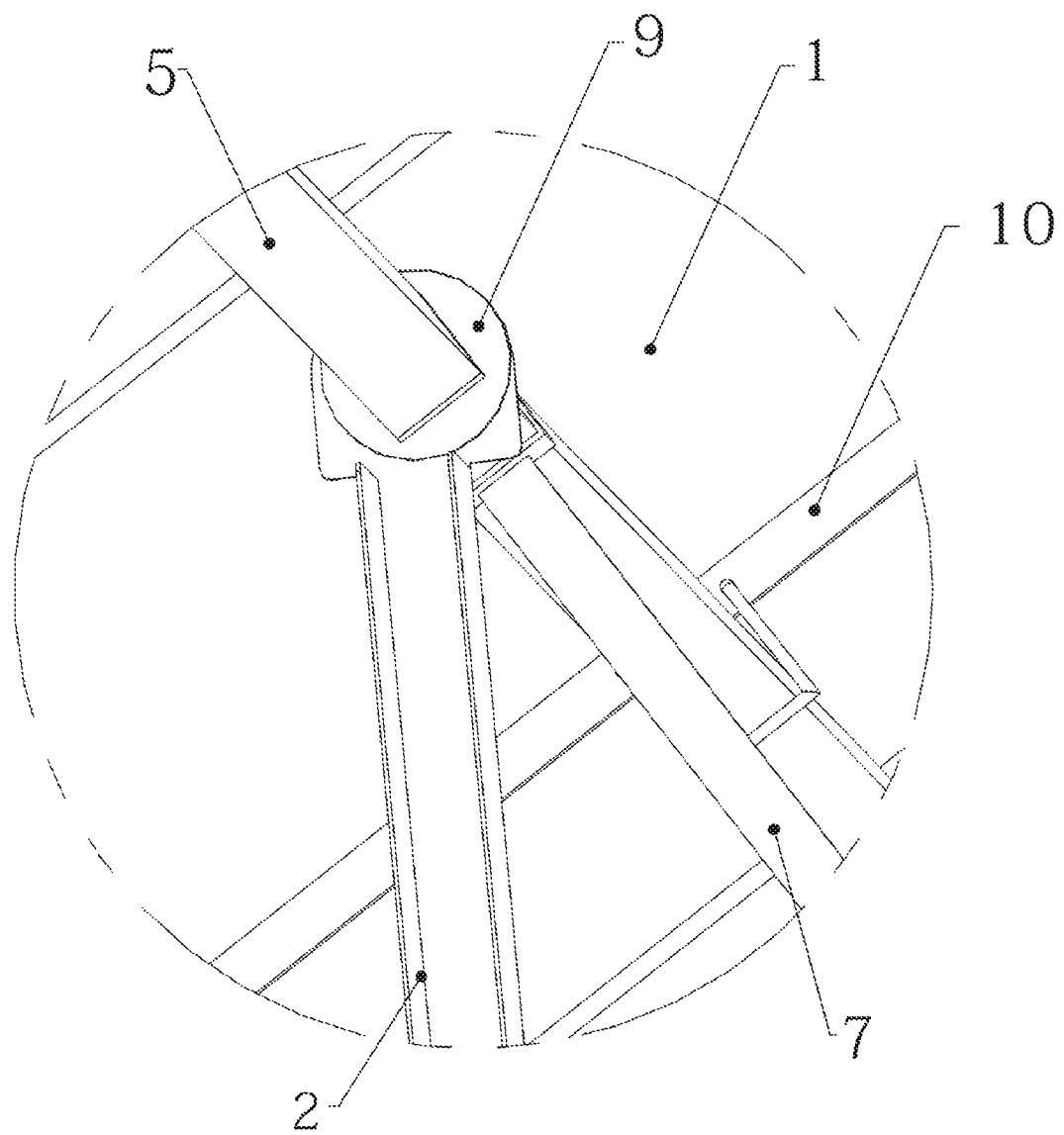
FIG. 9 is a partially enlarged view of A in FIG. 2.
Figure 10:
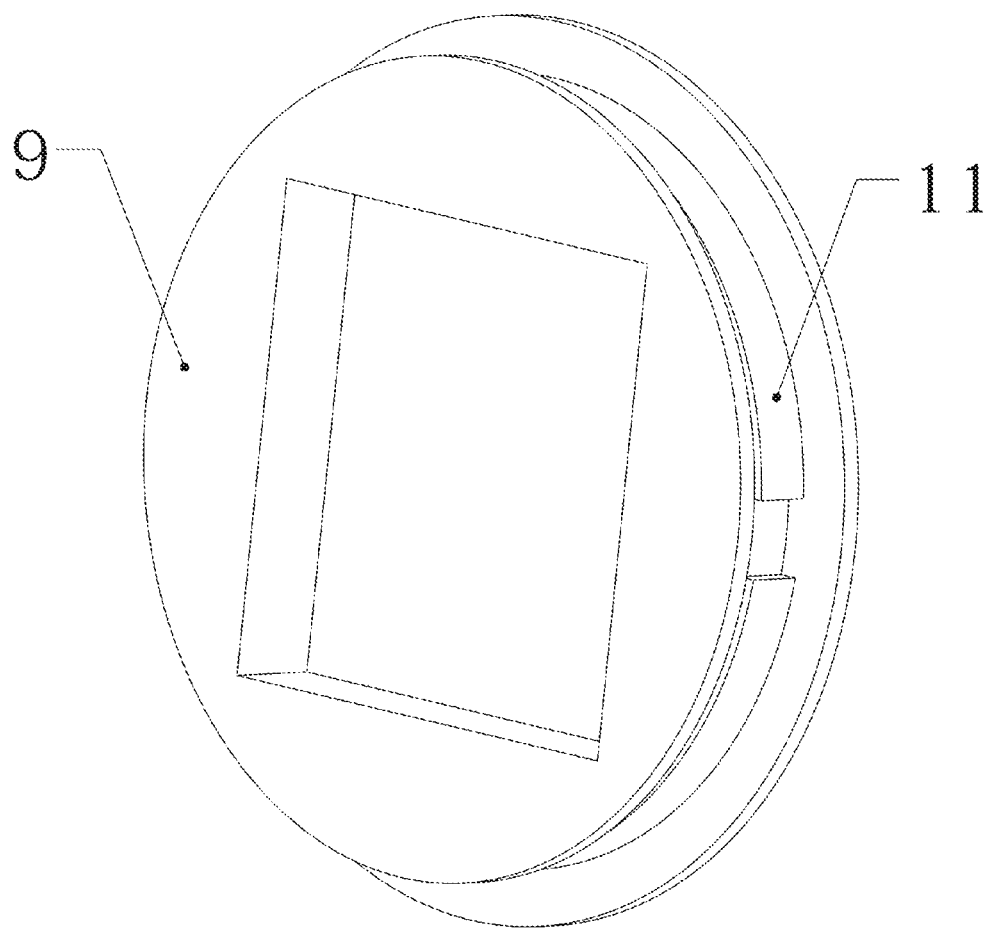
FIG. 10 is a schematic view showing the installation of the self-lubricating composite sleeve with the square shape-to-circle shape portion.
Figure 11:
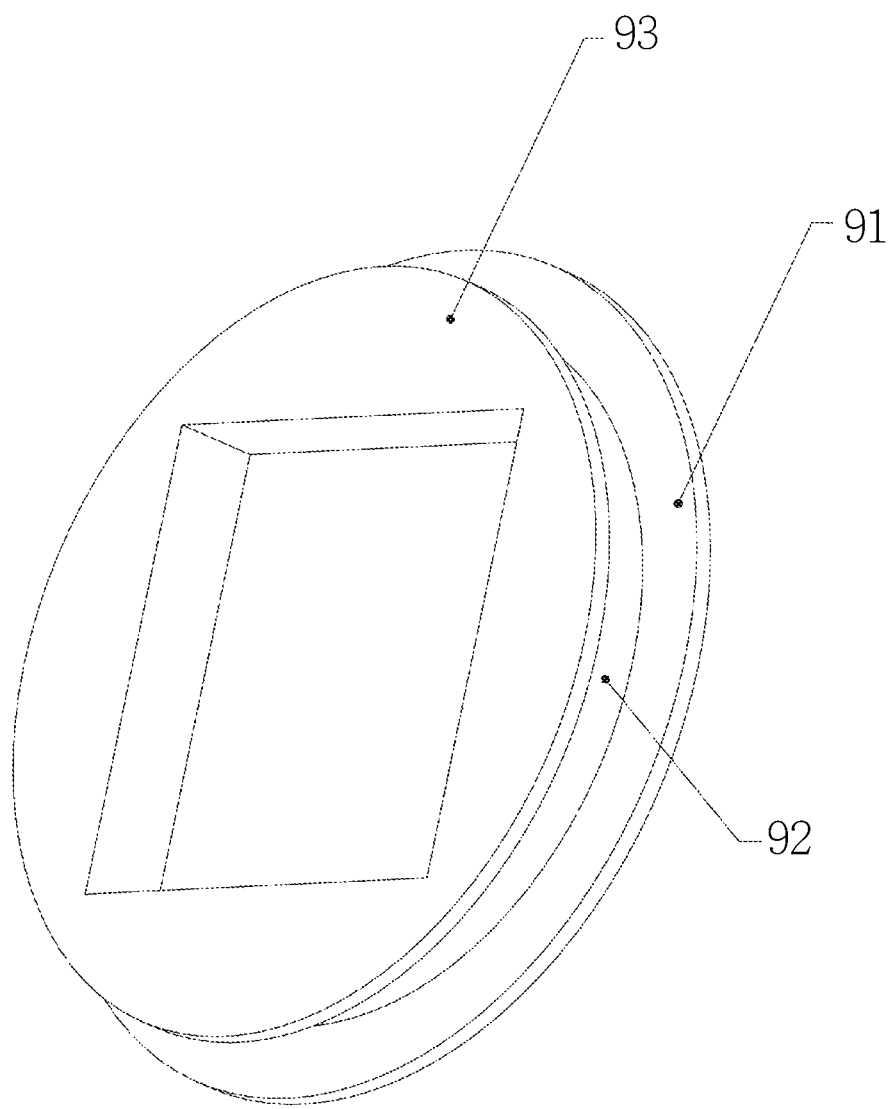
FIG. 11 is a schematic view of the self-lubricating composite sleeve with the square shape-to-circle shape portion.
Figure 12:
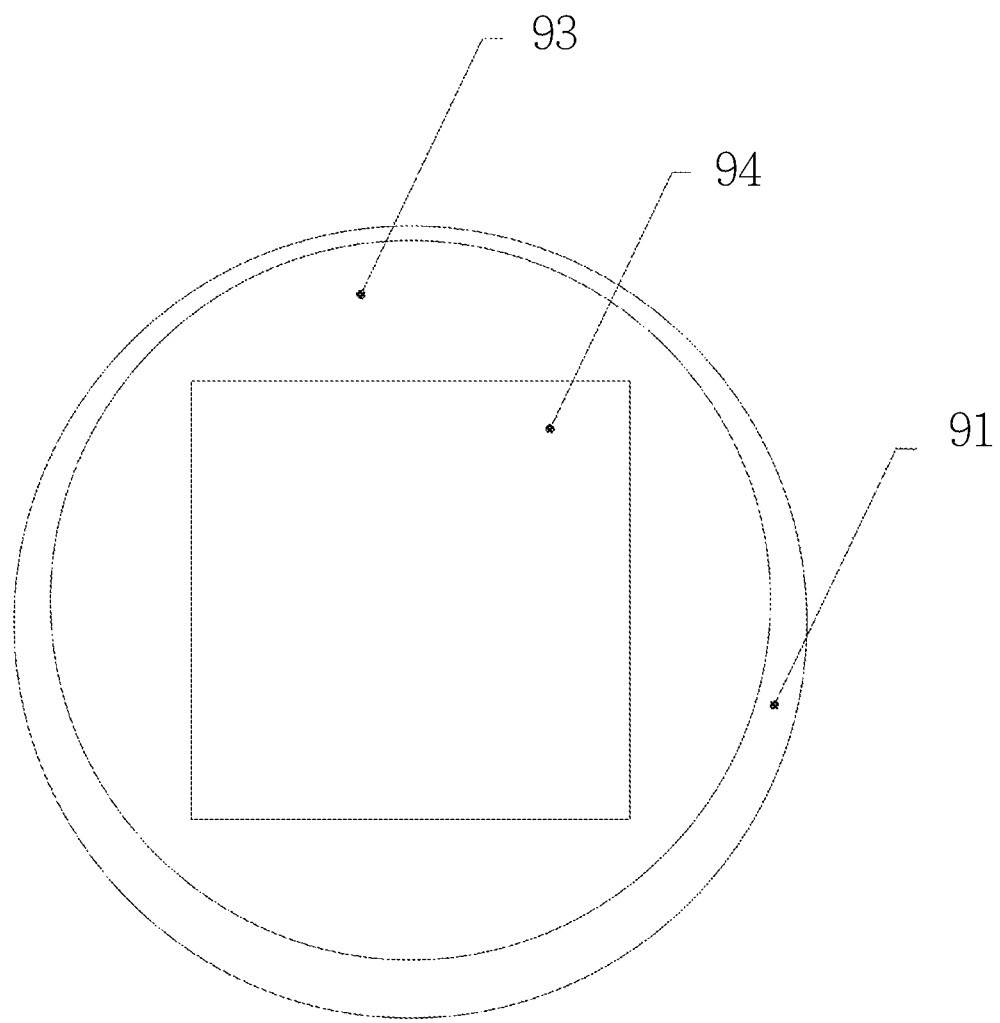
FIG. 12 is another schematic view of the self-lubricating composite sleeve with the square shape-to-circle shape portion.
Figure 13:
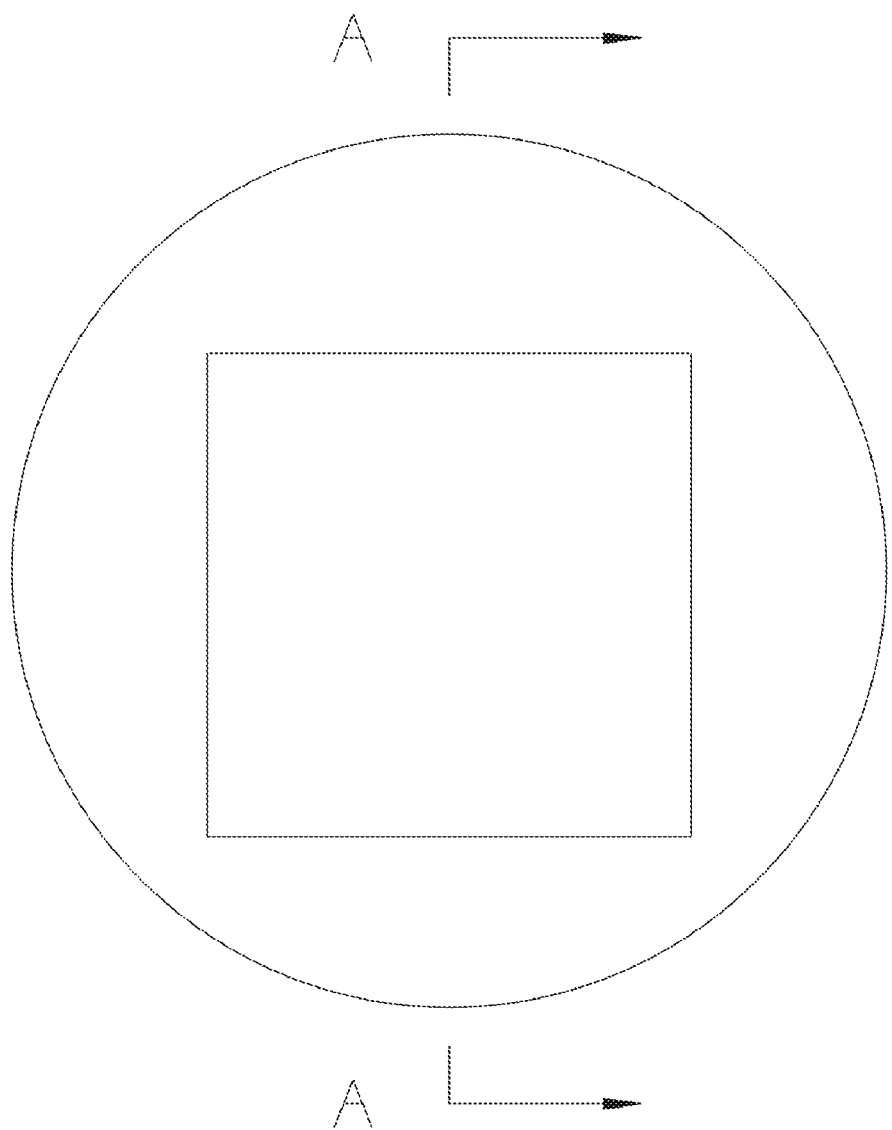
FIG. 13 is still another schematic view of the self-lubricating composite sleeve with the square shape-to-circle shape portion.
Figure 14:
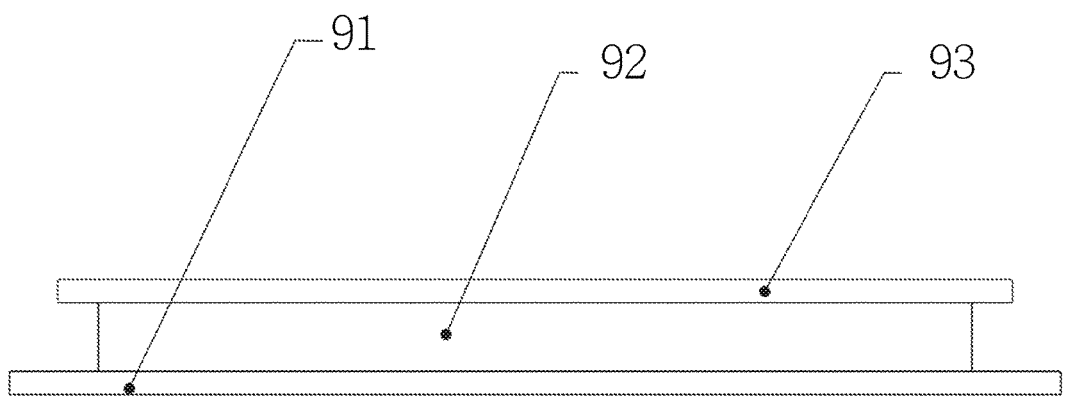
FIG. 14 is also a schematic view of the self-lubricating composite sleeve with the square shape-to-circle shape portion.
Figure 15:
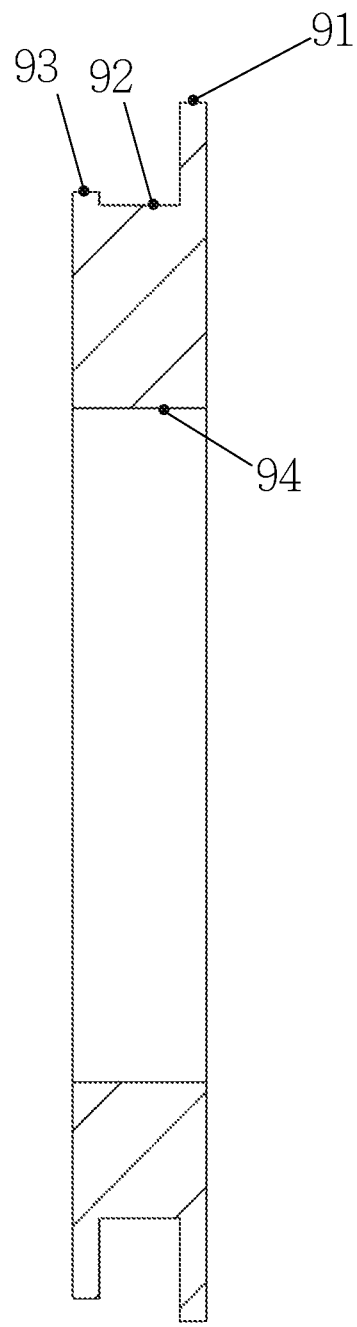
FIG. 15 is a cross sectional view of A-A in FIG. 13.
Figure 16:
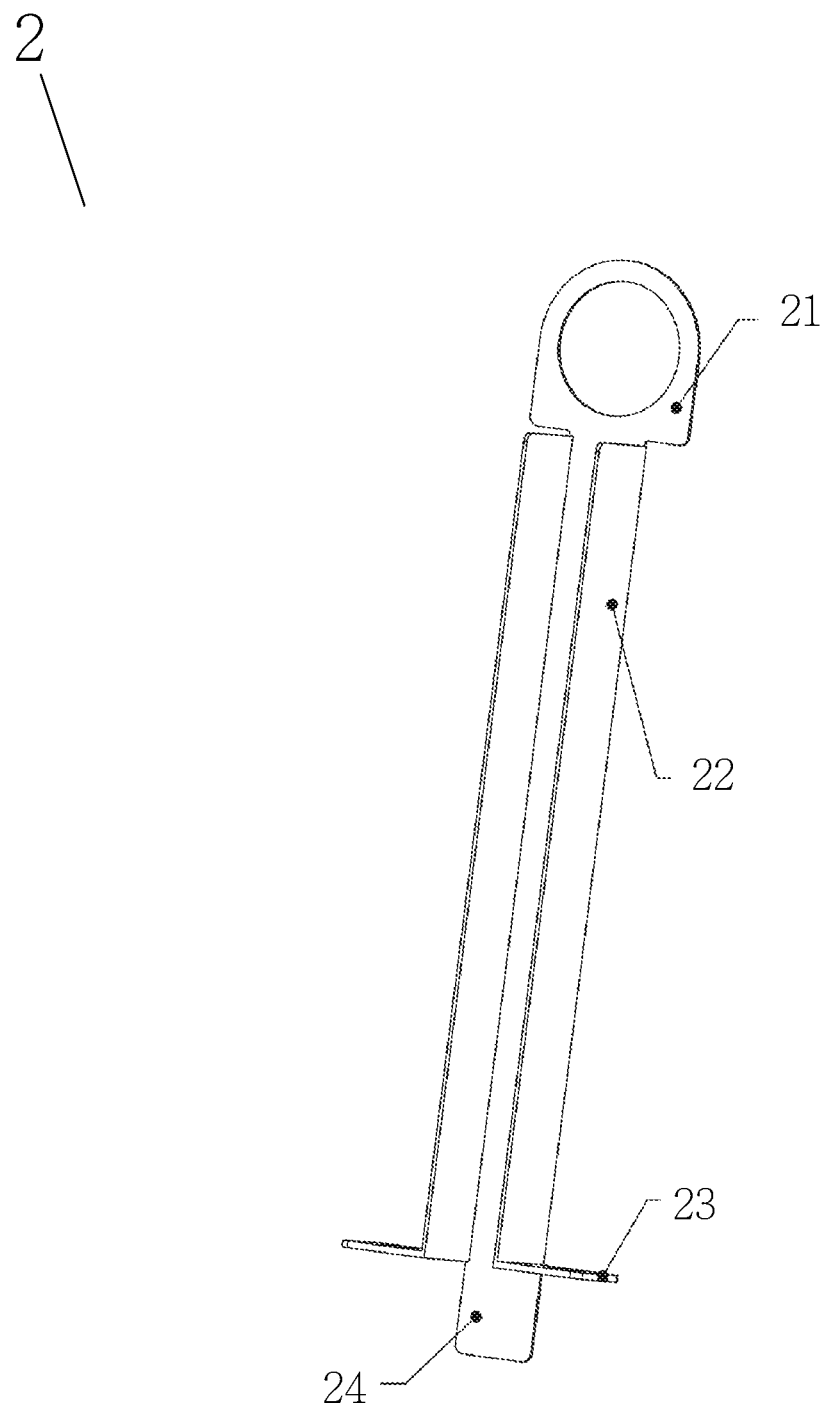
FIG. 16 is a schematic view of the separated composite stand.
Figure 17:
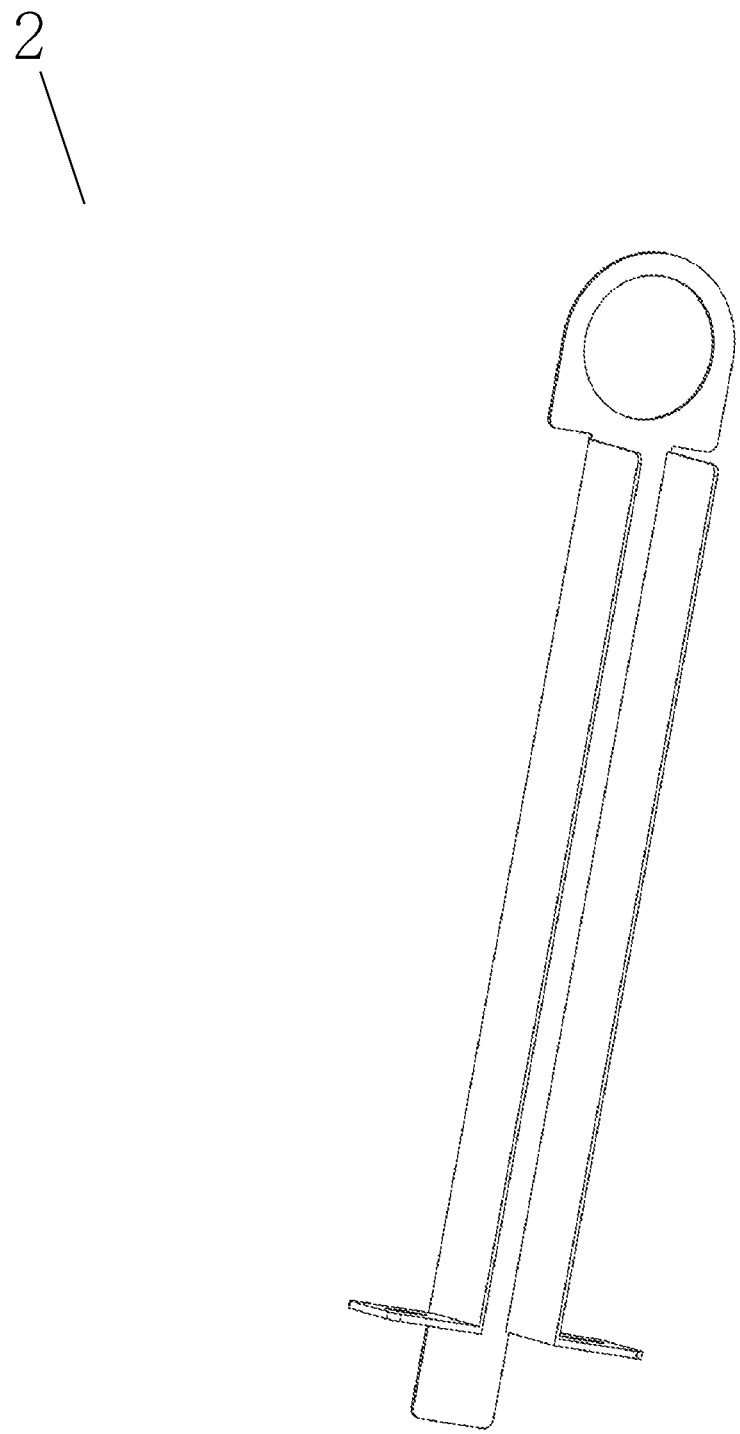
FIG. 17 is another schematic view of the separated composite stand.
Figure 18:
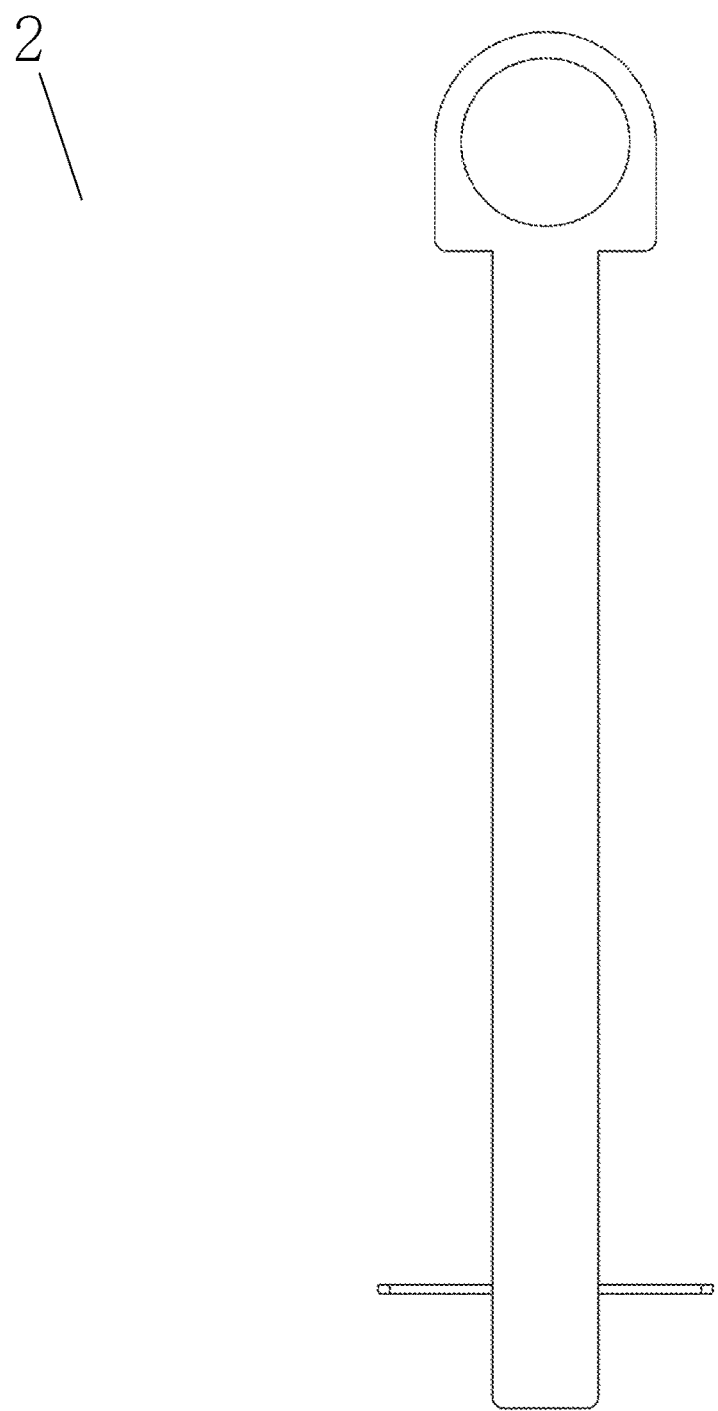
FIG. 18 is still another schematic view of the separated composite stand.
Figure 19:
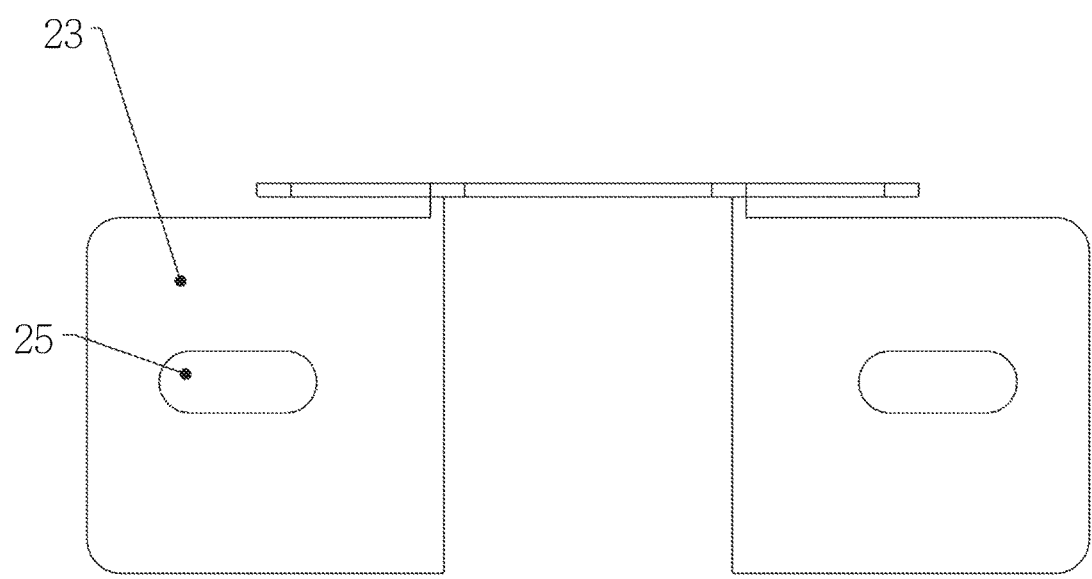
FIG. 19 is also a schematic view of the separated composite stand.
Figure 20:
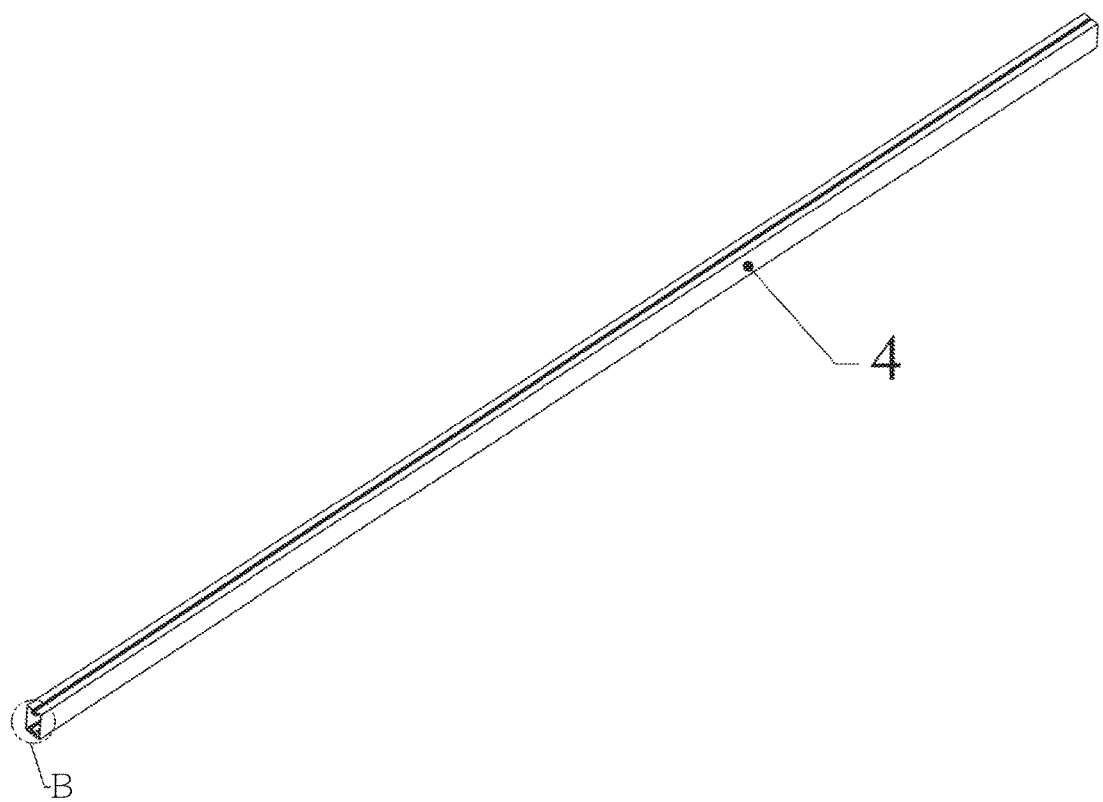
FIG. 20 is a schematic view of the main beam with double-slot.
Figure 21:
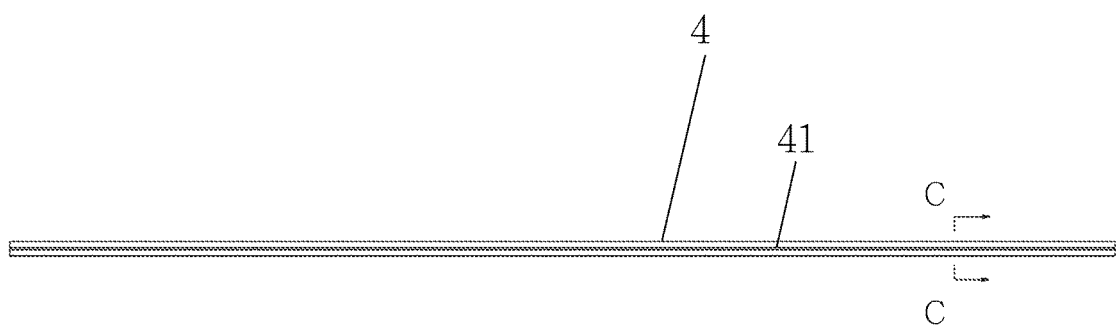
FIG. 21 is another schematic view of the main beam with double-slot.
Figure 22:
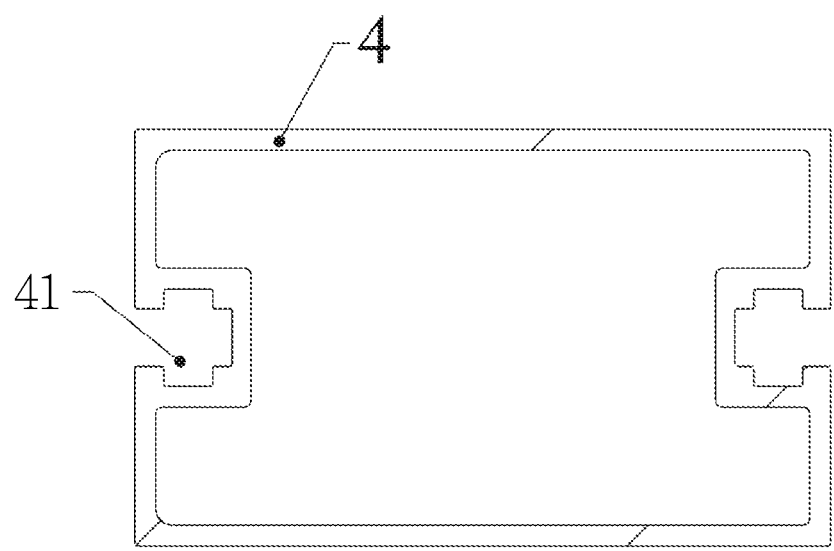
FIG. 22 is a cross sectional view of C-C in FIG. 21.
Figure 23:
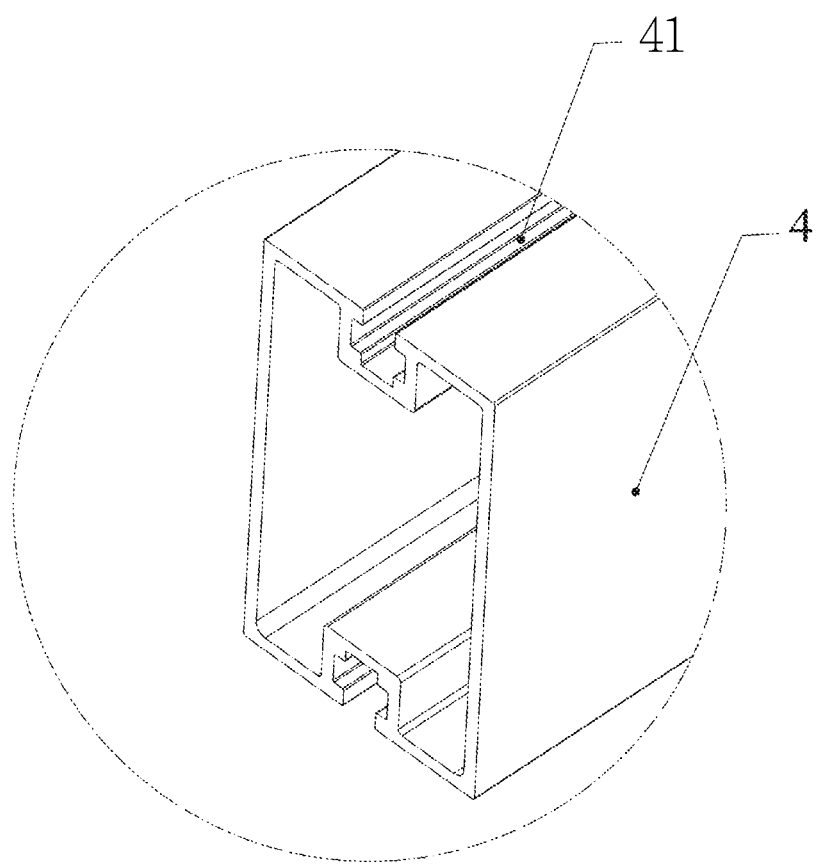
FIG. 23 is a partially enlarged view of B in FIG. 20.
Figure 24:
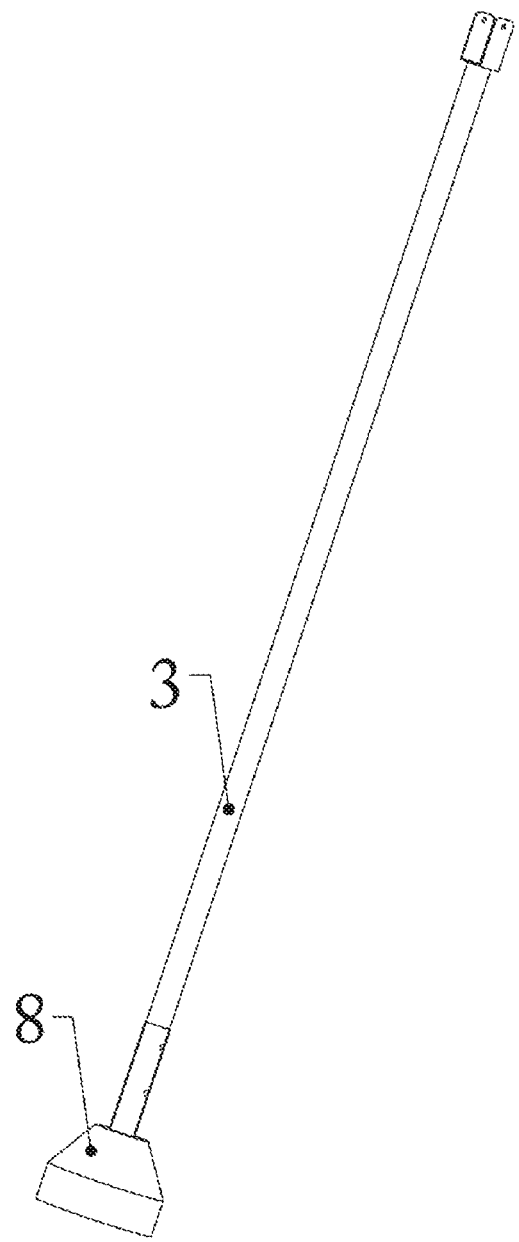
FIG. 24 is a schematic view showing the fitting installation of the standing column and the base.
Figure 25:
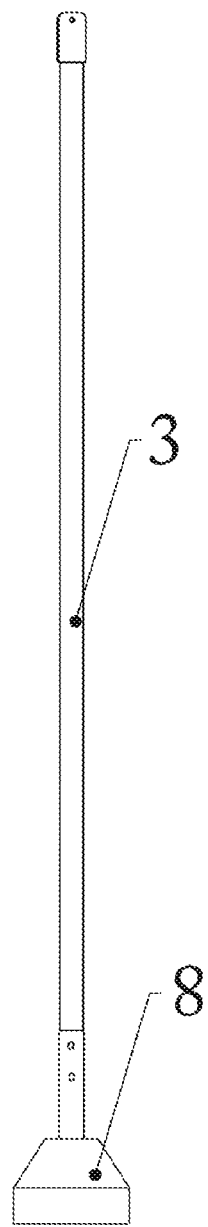
FIG. 25 is another schematic view showing the fitting installation of the standing column and the base.
Figure 26:
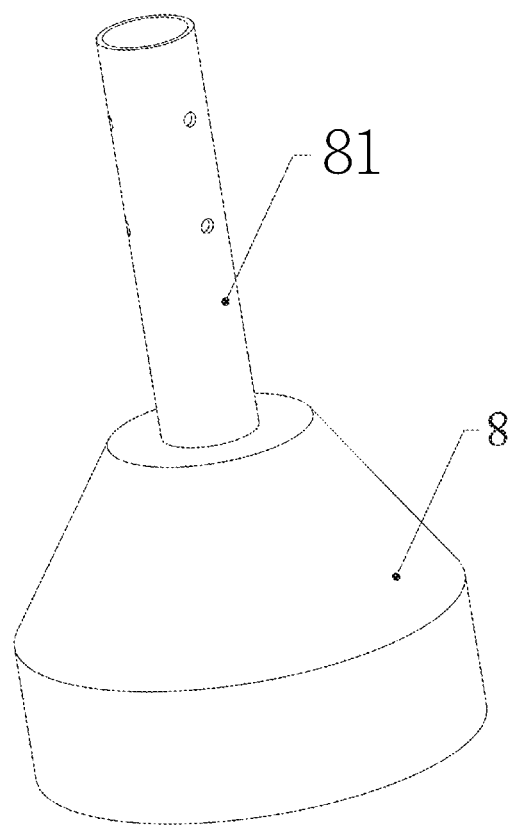
FIG. 26 is a schematic view of the base.
Figure 27:
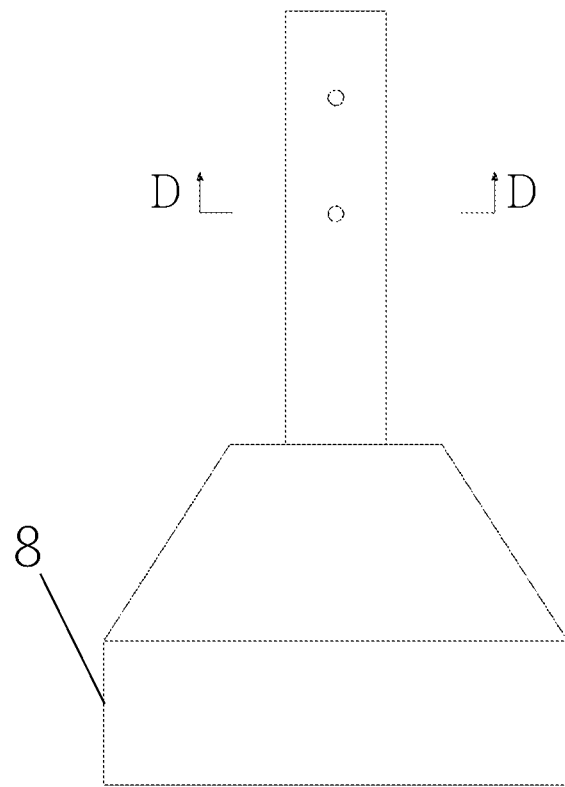
FIG. 27 is another schematic view of the base.
Figure 28:
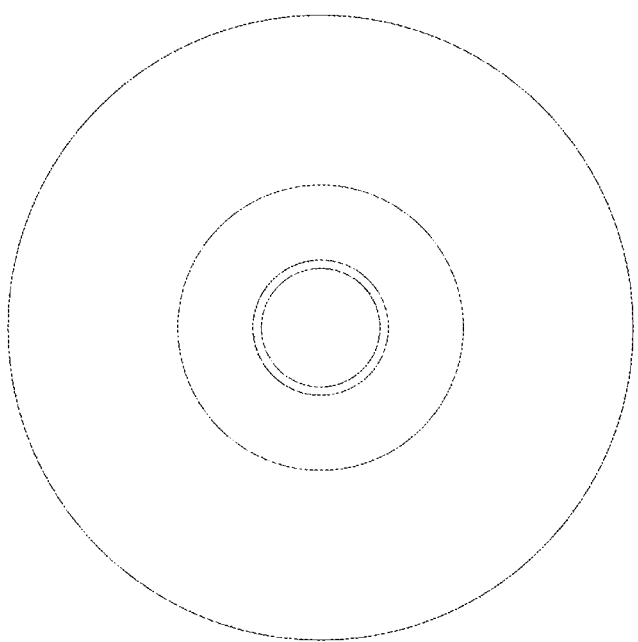
FIG. 28 is still another schematic view of the base.
Figure 29:
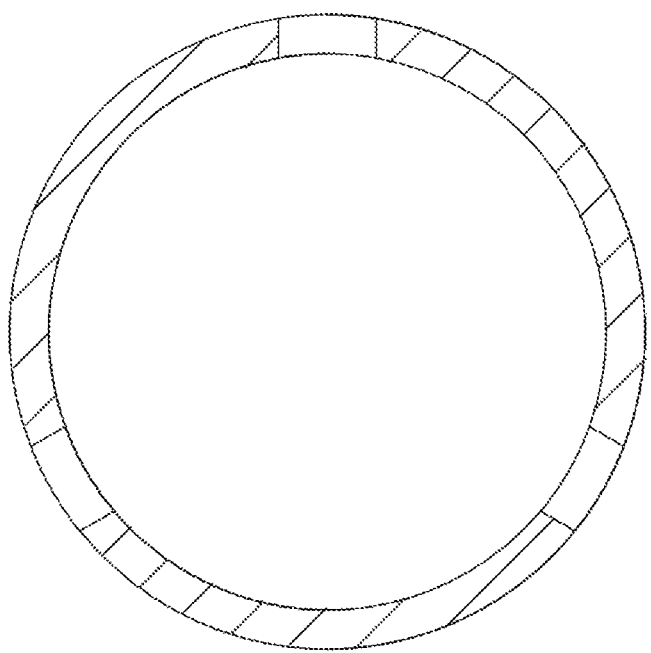
FIG. 29 is a cross sectional view of D-D in FIG. 27.

As shown in FIG. 4 and FIG. 8, the shaft with square of a shape of cross-section 5 and the main beam with double-slot 4 are arranged perpendicular to each other. The photovoltaic panels 1 are installed onto the shaft with square of a shape of cross-section 5 via the secure beam 10. The shaft with square of a shape of cross-section 5 is installed on the separated composite stand 2 via the self-lubricating composite sleeve with the square shape-to-circle shape portion 9. The bottom portion of the separated composite stand 2 is connected via the T-shape bolt inside the slot 41 installed on the top portion of the main beam with double-slot 4, and the main beam with double-slot 4 is further connected to the standing column 3. The bottom of the standing column 3 is connected to the base 8 via the T-shape bolts. One end of the transmission shaft 7 is connected to the shaft with square of a shape of cross-section 5 and another end thereof is connected to the driving shaft 6. Since the main beam with double-slot 4 and the shaft with square of a shape of cross-section 5 are perpendicular to each other and are connected via the separated composite stand 2, the present invention can be form of a web structure. Consequently, when a certain number of single-row photovoltaic arrays are installed on the main beam with double-slot 4, the entire structure can be of greater stability and greater performance in terms of wind resistance and tipping-over resistance.

The aforementioned description of the embodiments disclosed is provided to allow a person skill in the art of tins field to achieve or use the present invention. It can be understood that numerous modifications of such embodiments are obvious to a person skilled in the art in this field. The general principle defined in this specification can be achieved in other embodiments without deviating from the spirit or scope of the present invention; therefore, the present invention shall not be restricted to such embodiments only and the scope of the present invention shall be determined based on the claims of the present invention.

What is claimed is:

1. A grid assembly intelligent photovoltaic power generation system, comprising
    a supporting unit;
    a separated composite stand secured on the supporting unit;
    a shaft with a square cross-section shape arranged on the separated composite stand and capable of rotating on the separated composite stand;
    a plurality of photovoltaic panels secured onto the shaft with a square cross-section shape and forming a single-row of photovoltaic panel grid; and
    a standing column installation shaft at a top portion of a base;
    wherein in a condition that a plurality of the photovoltaic panel grids form a photovoltaic array, a certain distance is formed between each row of the photovoltaic panel grid, the supporting unit comprises a standing column and a main beam with double-slot; a top portion of the standing column is connected to the main beam with double-slot and a bottom portion thereof is connected to the base, wherein the standing column installation shaft includes two rows of secure holes formed thereon, and each row of secure holes include three threaded holes arranged at 120 degrees with each other; a protective cover is arranged at a connecting portion between the base and the standing column.

2. The grid assembly intelligent photovoltaic power generation system according to claim 1, wherein the shaft with a square cross-section shape and the main beam with double-slot are arranged perpendicular to each other and are installed onto the separated composite stand via a self-lubricating composite sleeve with a square shape-to-circle shape portion; a bottom portion of the separated composite stand is connected to T-shape bolts installed inside slots at a top portion of the main beam with double-slot; the photovoltaic panels are installed onto the shaft with a square cross-section shape via a secure beam.

3. The grid assembly intelligent photovoltaic power generation system according to claim 1, further comprising a transmission shaft and a driving shaft; the transmission shaft includes one end connected to the shaft with a square cross-section shape and another end connected to the driving shaft.

4. The grid assembly intelligent photovoltaic power generation system according to claim 3, further comprising an intelligent type control box with a processing unit, an angle detector and a driving mechanism; wherein the intelligent type control box with the processing unit is installed at the standing column, the angle detector is installed on the photovoltaic panel grid at a lateral side of the intelligent type control box with the processing unit, and the driving mechanism is connected to the driving shaft.

5. The grid assembly intelligent photovoltaic power generation system according to claim 1, wherein the main beam with double-slot includes special slots for T-shape bolts formed on top and bottom portions of the main beam with double-slot.

6. The grid assembly intelligent photovoltaic power generation system according to claim 2, wherein a wear-resistant composite spacer is arranged between the separated composite stand and the self-lubricating composite sleeve with the square shape-to-circle shape portion.

7. The grid assembly intelligent photovoltaic power generation system according to claim 2, wherein the self-lubricating composite sleeve with the square shape-to-circle shape portion includes a square hole formed at middle portion thereof, and a small circular plate and a large circular plate are arranged at two sides thereof respectively, and a central circular column is arranged between the small and large circular plates; an axial line of the large circular plate and an axial line of the small circular plate are non-collinear.

8. The grid assembly intelligent photovoltaic power generation system according to claim 1, wherein a top portion of the separated composite stand includes a sleeve installation portion having a circular hole formed thereon; a lower portion of the sleeve installation portion includes a vertical plate, and a side plate is arranged at two sides of the vertical plate and perpendicular to the vertical plate; a lower portion of the side plate includes a horizontal plate arranged perpendicular thereto, and the horizontal plate includes secure holes formed thereon.

* * * * *